United States Patent
Lang et al.

(10) Patent No.: US 9,771,709 B2
(45) Date of Patent: Sep. 26, 2017

(54) CONTROL CARTRIDGE FOR SANITARY FITTINGS

(71) Applicant: OBLAMATIK AG, Chur (CH)

(72) Inventors: Edo Lang, Chur (CH); Roland Obrist, Scharans (CH)

(73) Assignee: Oblamatik AG, Chur (CH)

( * ) Notice: Subject to any disclaimer, the term of this patent is extended or adjusted under 35 U.S.C. 154(b) by 0 days.

(21) Appl. No.: 14/895,124

(22) PCT Filed: May 19, 2014

(86) PCT No.: PCT/EP2014/060224
§ 371 (c)(1),
(2) Date: Dec. 1, 2015

(87) PCT Pub. No.: WO2014/195120
PCT Pub. Date: Dec. 11, 2014

(65) Prior Publication Data
US 2016/0115678 A1   Apr. 28, 2016

(30) Foreign Application Priority Data

Jun. 3, 2013   (CH) ...................................... 1048/13

(51) Int. Cl.
*E03C 1/00*   (2006.01)
*E03C 1/04*   (2006.01)
(Continued)

(52) U.S. Cl.
CPC .............. *E03C 1/0404* (2013.01); *E03C 1/04* (2013.01); *E03C 1/057* (2013.01); *F16K 11/0787* (2013.01)

(58) Field of Classification Search
CPC ................................................. G05D 23/1393
(Continued)

(56) References Cited

FOREIGN PATENT DOCUMENTS

DE    102005061031 A1 *  6/2007  ............... E03C 1/05
EP            1601841 A1    12/2005
(Continued)

*Primary Examiner* — Lori Baker
(74) *Attorney, Agent, or Firm* — Notaro, Michalos & Zaccaria P.C.

(57) ABSTRACT

A control cartridge (2) for installation in a cartridge housing (3) of a sanitary fitting (1) comprises a first feed opening (4) and a discharge opening (6) as well as one or more seals (7), which are configured for sealing abutment on an internal surface (8) of the cartridge housing (3). Said seals (7) are arranged in such a way that after the completed installation of the control cartridge (2) in a cartridge housing (3) of a sanitary fitting (1) the first feed opening (4) is joined in a sealed manner to a cold-water or mixed-water connection (9) of the sanitary fitting (1) and the discharge opening (6) is joined in a sealed manner to a discharge pipe (11) of the sanitary fitting (1). The first feed opening (4) in the cartridge housing (3) or in the control cartridge (2) is directly connected to the discharge opening (6) which is sealed with respect to the cartridge housing (3). The control cartridge (2) comprises a second feed opening (5) in which an electric line (12) is disposed which connects an electrical switch (13) of the control cartridge (2) to a valve (16) arranged in a cold-water or mixed-water feed pipe (14) at least for switching a water flow on and off.

12 Claims, 1 Drawing Sheet

(51) Int. Cl.
*E03C 1/05* (2006.01)
*F16K 11/078* (2006.01)

(58) Field of Classification Search
USPC .............................................. 4/668
See application file for complete search history.

(56) References Cited

FOREIGN PATENT DOCUMENTS

EP 2250321 A1 11/2010
WO 2004013966 A1 2/2004

\* cited by examiner

Fig. 1
Fig. 2
Fig. 3
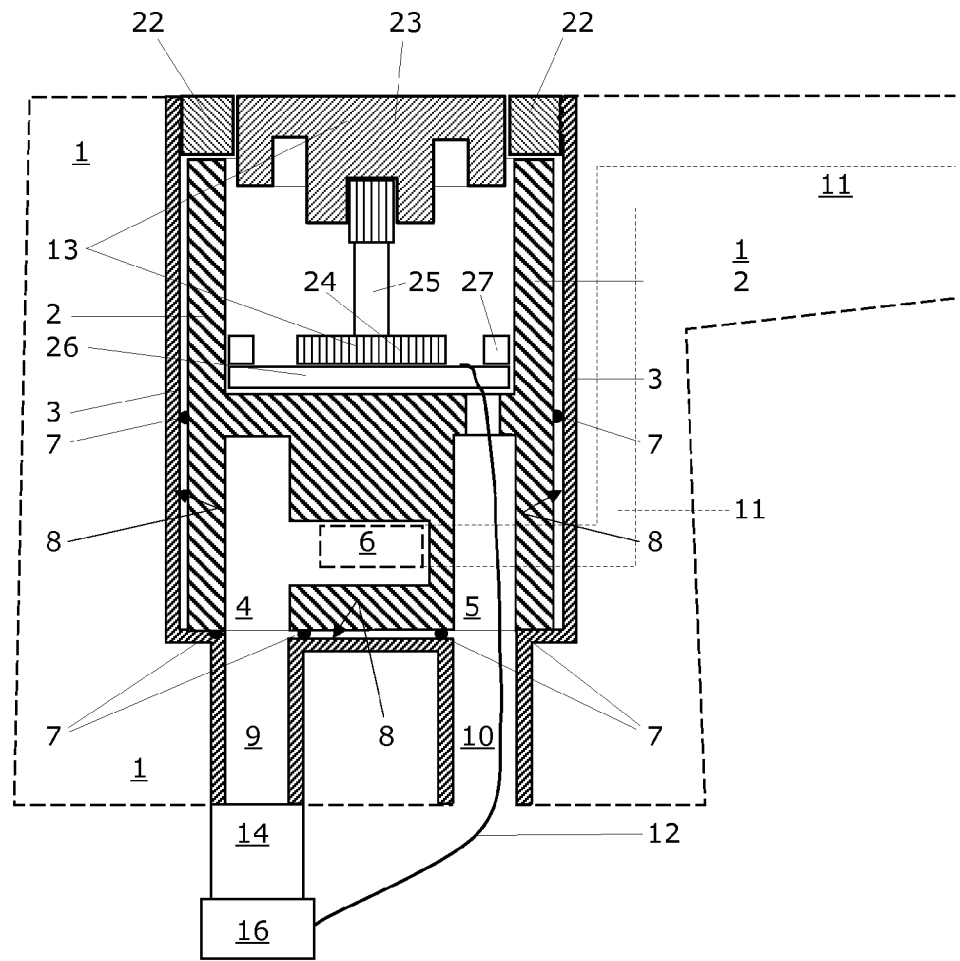
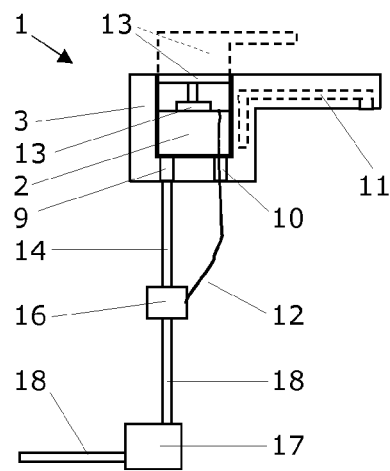
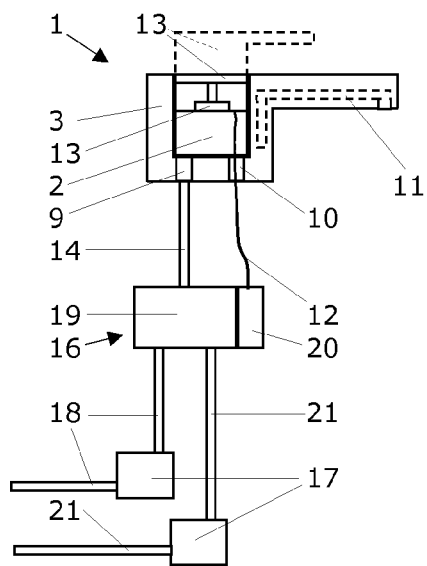

CONTROL CARTRIDGE FOR SANITARY FITTINGS

RELATED APPLICATIONS

The present application claims priority of the Swiss patent application No. 01048/13 filed on Aug. 3, 2013 and of the international application No. PCT/EP2014/060224 filed on May 19, 2014. The entire disclosure of these two applications is herein incorporated by express reference for any purpose.

RELATED FIELD OF TECHNOLOGY

The invention relates to a control cartridge for installation in a cartridge housing of a sanitary fitting. The control cartridge comprises a first feed opening and a discharge opening as well as one or more seals. Said seals are designed for sealing abutment on an internal surface of the cartridge housing, and are arranged in such a way that after the installation of the control cartridge in a cartridge housing of a sanitary fitting the first feed opening is joined in a sealed manner to a cold-water or mixed-water connection of the sanitary fitting and the discharge opening is joined in a sealed manner to a discharge pipe of the sanitary fitting. Furthermore, the present invention relates to an electronic sanitary fitting with such a control cartridge.

RELATED PRIOR ART

Sanitary fittings for controlling the water feed to a sanitary apparatus and optionally for changing the water temperature are known from the prior art. Mixer taps and mixer fittings for mixing cold and hot water are also known.

Older mixer taps comprise a cold-water connection and a hot-water connection, which are each equipped with a separate dosing valve with a turning handle and which open into a common outlet or faucet. A desired water temperature and a desired water flow are achieved by manually setting the combination of suitable opening states of the two dosing valves. The seals of the dosing valves are susceptible to damage and to differences in temperature. Furthermore, the valves of the said mixer fittings, which usually comprise copper or brass components, have a tendency towards blocking and need to be replaced occasionally.

More modern mixer fittings are formed as single-lever mixers, whose functional core is a so-called cartridge. Two absolutely flat ceramic discs are situated in such a cartridge, which discs can be displaced and/or twisted against each other. The cold-water feed and the hot-water feed and the discharge of the fitting are usually connected to three holes in a first fixed ceramic disc which is used as the valve seat. A twistable and pivotable lever acts via a bearing on the second (movable) ceramic disc, into which a channel is incorporated, which depending on the position of the movable ceramic disc connects no channel, two channels or all three channels of the fixed ceramic disc to a higher or lower extent. Since the actuating paths of such single-lever mixer taps are very short and the fitting can thus be closed very rapidly, pressure shocks occur frequently during rapid closure, which lead to high pressure loading of the pipe network and noise disturbances. Major efforts were undertaken in order to at least partly remedy these disadvantages of the single-lever mixers. Such a single-lever mixer is known for example from the document EP 2 354 608 A1. However, a latching characteristic is additionally used there which shall enable the water-saving operation of the single-lever mixer.

OBJECTS AND SUMMARY OF THE PRESENT INVENTION

It is the object of the present invention to propose an alternative control cartridge for installation in a cartridge housing of a sanitary fitting.

This object is achieved according to a first aspect in that a control cartridge with the features of claim 1 is proposed. Said control cartridge for installation in a cartridge housing of a sanitary fitting comprises a first feed opening and a discharge opening as well as one or more seals which are designed for sealing abutment on an internal surface of the cartridge housing, and are arranged and formed in such a way that after the installation of the control cartridge in a cartridge housing of a sanitary fitting the first feed opening is joined in a sealed manner to a cold-water or mixed-water connection of the sanitary fitting and the discharge opening is joined in a sealed manner to a discharge pipe of the sanitary fitting.

The control cartridge in accordance with the invention is characterized in that the first feed opening in the cartridge housing or in the control cartridge is directly connected to the discharge opening which is sealed with respect to the cartridge housing, and the control cartridge comprises a second feed opening in which an electric line is arranged which connects an electrical switch of the control cartridge to a valve arranged in a cold-water or mixed-water feed pipe at least for switching a water flow on and off.

The second feed opening of the control cartridge is preferably also sealed with respect to the interior surface of the cartridge housing.

This object is achieved according to a second aspect in that an electronic sanitary fitting is proposed which comprises a control cartridge in accordance with the invention.

Preferred embodiments as well as additional and inventive features of the control cartridge and the sanitary fitting are provided in the dependent claims.

Advantages of the Present Invention

The advantages of the present invention comprise the following:
  The control cartridge in accordance with the invention can be inserted into the cartridge housing of existing sanitary fittings without having to change anything with respect to the fitting or the cartridge housing.
  Since the cartridge housings of many known sanitary fittings are standardised, these fittings can be converted in the simplest possible way by inserting a control cartridge in accordance with the invention into electronically controllable sanitary fittings.
  The actuating elements (levers, etc.) of the sanitary fittings can be further used or be replaced by especially designed actuating elements.
  An electronic sanitary fitting in accordance with the invention can contribute to saving water because limited opening times can be defined, so that the electronically controlled sanitary fitting can automatically limit or even interrupt the water taking after a specific opening time (e.g. in the case of hot showers that take too long or when cleaning teeth while letting the water run).

An electronic sanitary fitting in accordance with the invention can comprise scalding protection in that a maximum temperature of the obtained water can be determined.

An electronic sanitary fitting in accordance with the invention can automatically perform hygienic rinsing in that sporadically (e.g. after 12 to 72 hours for example) the lines are flushed and any germs in the stagnant water are thus removed.

Electronically controlled sanitary fittings with simple surfaces, i.e. without protruding actuating levers and the like, offer new design possibilities and can further be cleaned in a more simple and secure manner.

Electronically controlled sanitary fittings with simple surfaces, i.e. without protruding actuating levers and the like, require less force for setting or changing the water flow and/or water temperature, which is especially appreciated by persons with limited fine motor skills.

In order to adjust the water temperature from cold to hot with known cartridges, the control lever needs to be adjusted by 120°, which can cause difficulties for persons with limited fine motor skills. Electronic sanitary fittings can be configured to be adjusted precisely at will in a simple way.

BRIEF INTRODUCTION TO THE FIGURES

The control cartridge in accordance with the invention and electronic sanitary fittings with such control cartridges are now explained in closer detail by reference to schematic drawings. Said drawings merely represent exemplary embodiments of the present invention and shall not limit the scope thereof, wherein:

FIG. 1 shows a vertical partial sectional view through a sanitary fitting which is formed as a single-lever mixer and comprises an inserted control cartridge;

FIG. 2 shows a vertical diagram of a simple sanitary fitting with an inserted control cartridge for obtaining cold or mixed water;

FIG. 3 shows a vertical diagram of an improved sanitary fitting with an inserted control cartridge for extracting cold, mixed or hot water.

DETAILED DESCRIPTION OF THE PRESENT INVENTION

FIG. 1 shows a vertical partial sectional view through a sanitary fitting 1 formed as a single-lever mixer and inserted control cartridge 2. Said control cartridge 2 is designed for installation in a cartridge housing 3 of a sanitary fitting 1. Said control cartridge 2 comprises a first feed opening 4 and a discharge opening 6 as well as one or several seals 7. Said seals 7 are designed for sealing abutment on an internal surface 8 of the cartridge housing 3. Said seals 7 are further arranged in such a way that after the completed installation of the control cartridge 2 in a cartridge housing 3 of a sanitary fitting 1 the first feed opening 4 is sealingly joined to a cold-water or mixed-water connection 9 of the sanitary fitting 1 and the discharge opening 6 is sealingly joined to a discharge pipe 11 of the sanitary fitting 1.

It is frequently the case in the USA that for water taking with a sanitary fitting 1 hot water is provided with a constant maximum temperature of approximately 45° C. In such cases, a mixing unit 19 can be avoided and a simple valve 16 (see FIG. 2) can be used. For this reason, reference is made below and in connection with the simple embodiments of the existing invention to "cold water" or "mixed water" and not "hot water". "Warm water" or "hot water" is typically supplied at higher temperatures to a mixing unit 19, so that hot water or mixed water (after the mixing with cold water) can be obtained from the sanitary fitting 1. According to this differentiation between "mixed water" and "hot water", the "mixed water" is placed on equal footing with the "cold water" in connection with the present invention.

The number of the seals 7 is based on the arrangement of the feed opening 4 and the discharge opening 6. Substantially two variants of cartridges are known from the prior art:

A single, rather complex seal 7 connects all inputs and outputs of the cartridge to incoming and outgoing lines. In such cases, the connections for all incoming or outgoing lines are preferably situated in a single plane of the inside surface of the cartridge housing (not shown).

Every single input and output of the cartridge is connected individually with a simple seal 7 (e.g. in form of an O-ring) to the connection of an incoming or outgoing line. In such cases, the connections for the incoming lines are usually located in a first plane and the connection for the outgoing line is situated in a second plane of the internal surface of the cartridge housing (cf. FIG. 1).

The routing of the lines and the respective seals 7 are arranged in the control cartridges 2 in accordance with the invention according to the known cartridges from the prior art. As a result, a control cartridge 2 in accordance with the invention can simply take the place of a cartridge from the prior art and guarantee the correct conduction of the water in combination with secure sealing. It can thus be provided that the second feed opening 5 of the control cartridge 2 is sealed against the internal surface 8 of the cartridge housing 3.

When the control cartridge 2 in accordance with the invention is used, the first feed opening 4 in the cartridge housing 3 or in the control cartridge 2 is directly connected to the discharge opening 6 which is sealed against the cartridge housing 3. Furthermore, the control cartridge 2 in accordance with the invention comprises a second feed opening 5 in which an electric line 12 is arranged. Said electric line 12 connects an electrical switch 13 of the control cartridge 2, e.g. for activating and deactivating a water flow with a valve 16 arranged in a cold-water or mixed-water feed pipe 14. Such a sanitary fitting 1 according to a first simple embodiment with installed control cartridge 2 is shown in FIG. 2.

FIG. 2 shows a vertical diagram of a simple sanitary fitting 1 according to a first embodiment, comprising a discharge pipe 11 and an inserted control cartridge 2 for obtaining cold water or mixed water. The cartridge 2 is inserted into the cartridge housing 3. A cold-water or mixed-water feed pipe 14 is connected to a cold-water or mixed-water connection 9 of the sanitary fitting 1. A valve 16 is installed between said cold-water or mixed-water feed pipe 14 and cold-water or mixed-water water mains 18, which valve is formed as a lock and dosing valve and is designed in an electrically triggerable manner. Said valve 16 is connected via an electric line 12 to an electrical switch 13 of the inserted control cartridge 2. A simple sanitary fitting 1 for obtaining cold water or mixed water is preferably selected in such a way that it additionally comprises a hot-water connection 10. As a result, the electric line 12 can be connected to the electrical switch 13 of the inserted control cartridge 2 via the hot-water connection 10 of the sanitary fitting 1 and by the second feed opening 5 of the control cartridge 2 (see FIG. 1).

The cold-water or mixed-water mains 18, which is shown in FIG. 2, preferably comprises an angle valve 17, which is used for closing the individual cold-water or mixed-water mains 18. After closing said angle valve 17, the valve 16 of a specific sanitary fitting 1 and also the entire sanitary fitting 1 can be removed or revised. It can be provided alternatively that a central stop valve is installed for a group or several groups of sanitary fittings 1. This allows the central closing of the cold-water or mixed-water mains 18 for all sanitary fittings 1 of such a group. After the closing of said central stop valve (not shown), all subsequent installations and sanitary fittings 1 can be removed or revised. A central stop valve is especially suitable for blocking the installations for obtaining water for seasonal reasons (e.g. for preventing the freezing of the water pipes) or in emergencies (e.g. in case of an accident).

FIG. 3 shows a vertical diagram of an improved sanitary fitting 1 according to a second embodiment, comprising an inserted control cartridge 2 for obtaining cold water, mixed water or hot water. The control cartridge 2 is inserted into the cartridge housing 3 of the sanitary fitting 1. The control cartridge 2 comprises a first feed opening 4 and a discharge opening 6 as well as one or several seals 7, which are designed for sealing abutment on an internal surface 8 of the cartridge housing 3. Said seals 7 are further arranged in such a way that after the completed installation of the control cartridge 2 in a cartridge housing 3 of a sanitary fitting 1 the first feed opening 4 is sealingly joined to a cold-water or mixed-water connection 9 of the sanitary fitting 1 and the discharge opening 6 is sealingly joined to a discharge pipe 11 of the sanitary fitting 1 (also see FIG. 1).

In accordance with the invention, the first feed opening 4 in the cartridge housing 3 or in the control cartridge 2 is also directly connected in this case to the discharge opening 6 which is sealed against the cartridge housing 3. Furthermore, the control cartridge 2 comprises a second feed opening 5 in which an electric line 12 is arranged which connects an electrical switch 13 of the control cartridge 2 for activating and deactivating a water flow to a valve 16 arranged in a cold-water or mixed-water feed pipe 14 (also see FIG. 1).

A mixed-water feed pipe 14 is connected to the cold-water or mixed-water connection 9 of the sanitary fitting 1. The valve 16 arranged in the mixed-water feed pipe 14 is an electrically triggerable mixing valve, which is connected to cold-water mains 18 and hot-water mains 21. Said valve 16 is connected via an electric line 12 to an electrical switch 13 of the inserted control cartridge 2. The valve 16 formed as a mixing valve comprises a mixing unit 19 with a motor 20, wherein the electrical switch 13 of the control cartridge 2 is designed for triggering the motor 20 and thus for changing the temperature and/or flow during water taking.

An improved sanitary fitting 1 for obtaining cold water, hot water or mixed water is preferably selected in such a way that it further comprises a hot-water connection 10. As a result, the electric line 12 can be connected to the electrical switch 13 of the inserted control cartridge 2 via the hot-water connection 10 of the sanitary fitting 1 and by the second feed opening 5 of the control cartridge 2 (see FIG. 1).

The cold-water mains 18 and hot-water mains 21, which are shown in FIG. 3, preferably each comprise an angle valve 17, which is used for closing the individual cold-water mains 18 or hot-water mains 21. After the closure of said angle valves 17 for a specific sanitary fitting 1, the valve 16 for said sanitary fitting 1 and also said entire sanitary fitting 1 can be removed or revised. It can be provided alternatively (as described above) that for a group or several groups of sanitary fittings 1 central stop valves (preferably separate for cold water and hot water) can be installed. This allows the central closure of the cold-water mains 18 and hot-water mains 21 for all sanitary fittings 1 of such a group.

It is preferred that the control cartridges 2 in accordance with the invention are fixed with one or several locking screws 22 in the cartridge housing 3 in such a way that the seals 7 rest in sealing abutment on the respective internal surfaces 8 of the cartridge housing 3. Said locking screws 22, which are known from the prior art, can be installed visibly for a spectator (see FIG. 1) or in a concealed manner, and fix the control cartridge 2 in the cartridge housing in such a way that it is fixed there immovably.

A sanitary fitting 1, which is suitable for installation of a control cartridge 2, is preferably formed as a single-lever mixer. Single-lever mixers are known that lifting and lowering of the lever increases or decreases the water flow, and pivoting of the lever is used for changing the water temperature.

The electrical switch 13 of the control cartridge 2 is preferably selected from a group which consists of proximity, touch-sensitive, pressure and rotary switches. Such an electrical switch 13 formed as a proximity or touch-sensitive switch can comprise an immobile cover (not shown). Such proximity and touch-sensitive switches are known from the prior art (see EP 1 601 841 B1 for example). Proximity switches based on capacitive sensor technology are known from WO 2004/013966 A1 for example. Alternative proximity switches can be formed on the basis of infrared sensors or radar sensors for example.

The electrical switch 13 can alternatively be formed as a pressure and/or rotary switch or as a rotary encoder 24, and comprise a movable cover. Such pressure and rotary switches or rotary encoders are known from the prior art (see EP 2 250 321 B1 for example) and preferably comprise rotary encoders based on the Hall principle. Alternative pressure switches can be based for example on piezo, capacitive or resistive technology. Furthermore, conventional mechanical switches or buttons can be used. Any desired combinations of these switches, buttons and rotary encoders 24 can also be used.

FIG. 1 shows a rotary switch with a movable cover. In this case, the electrical switch 13 comprises a rotary part 23 which is visible from the outside and can be formed as a chrome-plated component for example. Furthermore, said electrical switch 13 comprises a rotary encoder 24 which is connected or connectable via a shaft 25 to the rotary part 23. The rotary encoder 24 is seated on an electronic circuit or an electronic printed circuit board (PCB) 26, or at least approaches such an electronic circuit. The electronic printed circuit board or PCB 26 is fixed with its rear side to the control cartridge 2. As a result, the light of two light-emitting diodes or LEDs 27 for example can be perceived by a user. For example, a gap is situated in this case between the fixing screw 22, which is annular in this case, and the rotary part 23, which can be penetrated by the LED light. As a possible alternative, the annular fixing screw 22 can be formed in a transparent manner for the LED light. The LED light can indicate with its intensity and/or colour the selected water flow and/or the selected water temperature. Blinking of the LEDs can signal an active mode of the electronic sanitary fitting. Such modes can comprise a service mode (e.g. during cleaning of the sanitary objects to which the electronic sanitary fitting 1 is connected) and/or a hygiene mode (e.g. for sporadically removing stagnant water).

Such electronic sanitary fittings of the first or second embodiment are preferably used in washbasins, wash bowls, bathtubs, bidets and kitchen fittings, as well as in showers of private and public buildings. The electronic sanitary fittings in accordance with the invention can also be used in ships or mobile homes.

LIST OF REFERENCE NUMERALS

1 Sanitary fitting
2 Control cartridge
3 Cartridge housing
4 First feed opening
5 Second feed opening
6 Discharge opening
7 Seal, seals
8 Internal surface of 3
9 Cold-water or mixed-water connection of 1
10 Hot-water connection of 1
11 Discharge pipe of 1
12 Electric line
13 Electrical switch of 2
14 Cold-water or mixed-water feed pipe
16 Valve
17 Angle valve
18 Cold-water or mixed-water mains
19 Mixing unit
20 Motor of 19
21 Hot-water mains
22 Fixing screw(s)
23 Rotary part
24 Rotary encoder
25 Shaft of 24
26 Electronic printed circuit board (PCB)
27 LED(s)

The invention claimed is:

1. A sanitary fitting (1) with a control cartridge (2) installed in a cartridge housing (3) of the sanitary fitting (1), wherein the control cartridge (2) comprises:
    (a) a first feed opening (4),
    (b) a discharge opening (6), and
    (c) one or more seals (7), which are configured for sealing abutment on an internal surface (8) of the cartridge housing (3), and are arranged in such a way that after the installation of the control cartridge (2) in a cartridge housing (3) of a sanitary fitting (1) the first feed opening (4) is joined in a sealed manner to a cold-water or mixed-water connection (9) of the sanitary fitting (1) and the discharge opening (6) is joined in a sealed manner to a discharge pipe (11) of the sanitary fitting (1),
    wherein the control cartridge (2) replaces conventional cartridges,
    wherein the first feed opening (4) in the cartridge housing (3) or in the control cartridge (2) is directly connected to the discharge opening (6) which is sealed with respect to the cartridge housing (3), and
    wherein the control cartridge (2) comprises a second feed opening (5) in which an electric line (12) is arranged, the electric line (12) connecting an electrical switch (13) of the control cartridge (2) to a valve (16) arranged in a cold-water or mixed-water feed pipe (14) that is connected to the cold-water or mixed-water connection (9) of the sanitary fitting (1) at least for switching a water flow on and off.

2. The sanitary fitting (1) with a control cartridge (2) according to claim 1,
    wherein the second feed opening (5) of the control cartridge (2) is sealed in relation to the internal surface (8) of the cartridge housing (3).

3. The sanitary fitting (1) with a control cartridge (2) according to claim 1,
    wherein the valve (16) arranged in the cold-water or mixed-water feed pipe (14) is a dosing valve which is connected to cold-water or mixed-water mains (18).

4. The sanitary fitting (1) with a control cartridge (2) according to claim 1,
    wherein the valve (16) arranged in the cold-water or mixed-water feed pipe (14) is a mixing valve which is connected to cold-water mains (18) and hot-water mains (21).

5. The sanitary fitting (1) with a control cartridge (2) according to claim 1,
    wherein the sanitary fitting (1) is a single-lever mixer.

6. The sanitary fitting (1) with a control cartridge (2) according to claim 4,
    wherein the valve (16) formed as a mixing valve comprises a mixing unit (19) with a motor (20), and
    wherein the electrical switch (13) of the control cartridge (2) is configured for triggering the motor (20) and thus for changing the temperature and/or the flow during water taking.

7. The sanitary fitting (1) with a control cartridge (2) according to claim 1,
    wherein the electrical switch (13) of the control cartridge (2) is selected from a group which consists of proximity, touch-sensitive, pressure and rotary switches, rotary encoders (24), and combinations thereof.

8. The sanitary fitting (1) with a control cartridge (2) according to claim 7,
    wherein the electrical switch (13) is formed as a proximity or touch-sensitive switch and comprises an immovable cover.

9. The sanitary fitting (1) with a control cartridge (2) according to claim 7,
    wherein the electrical switch (13) is formed as a pressure and/or rotary switch and comprises a movable cover.

10. The sanitary fitting (1) with a control cartridge (2) according to claim 3,
    wherein the cold-water or mixed-water mains (18) comprises an angle valve (17) or a central stop valve.

11. The sanitary fitting (1) with a control cartridge (2) according to claim 4,
    wherein the cold-water mains (18) and the hot-water mains (21) each comprise an angle valve (17) or a common central stop valve.

12. The sanitary fitting (1) with a control cartridge (2) according to claim 11,
    wherein the common central stop valve is separated for cold water and hot water.

* * * * *